No. 769,975. PATENTED SEPT. 13, 1904.
J. P. WOOD.
STORAGE BATTERY.
APPLICATION FILED MAR. 14, 1904.
NO MODEL. 2 SHEETS—SHEET 1.

WITNESSES
JW Pittapiece
CB Butler

INVENTOR
James P. Wood
By
W. T. Miller
ATTORNEY

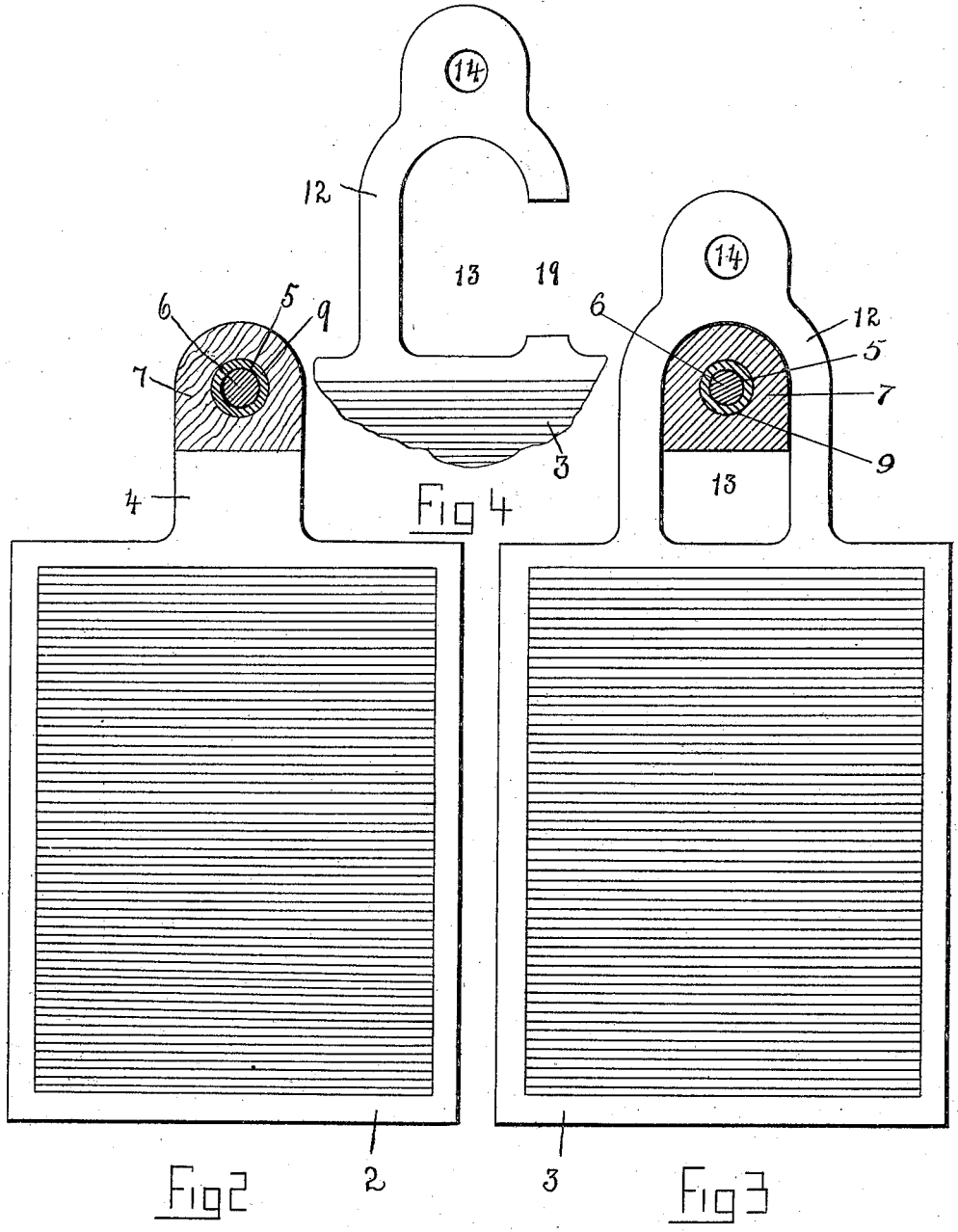

No. 769,975. Patented September 13, 1904.

UNITED STATES PATENT OFFICE.

JAMES P. WOOD, OF BUFFALO, NEW YORK.

STORAGE BATTERY.

SPECIFICATION forming part of Letters Patent No. 769,975, dated September 13, 1904.

Application filed March 14, 1904. Serial No. 198,088. (No model.)

*To all whom it may concern:*

Be it known that I, JAMES P. WOOD, a citizen of the United States, residing at Buffalo, in the county of Erie and State of New York, have invented certain new and useful Improvements in Storage Batteries; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

My invention relates to improvements in storage batteries, and more particularly to an improved arrangement of the positive and negative plates of the battery.

The objects of my invention are broadly to simplify the construction of parts, thereby increasing their efficiency and durability, and specifically to effect a radical movement in the form and arrangement of the positive and negative plates, whereby their assemblage in operative position and their separate and collective removal for renewal or repair are greatly facilitated, the necessity of separating-plates, insulating-rods, and supports within the cell, all now in common use, being eliminated and the present practice of burning or soldering a connecting-strip to the plates being entirely done away with.

My invention consists of certain details of construction and arrangement of parts, all of which will be more particularly hereinafter described, and pointed out in the claims.

Figure 1:
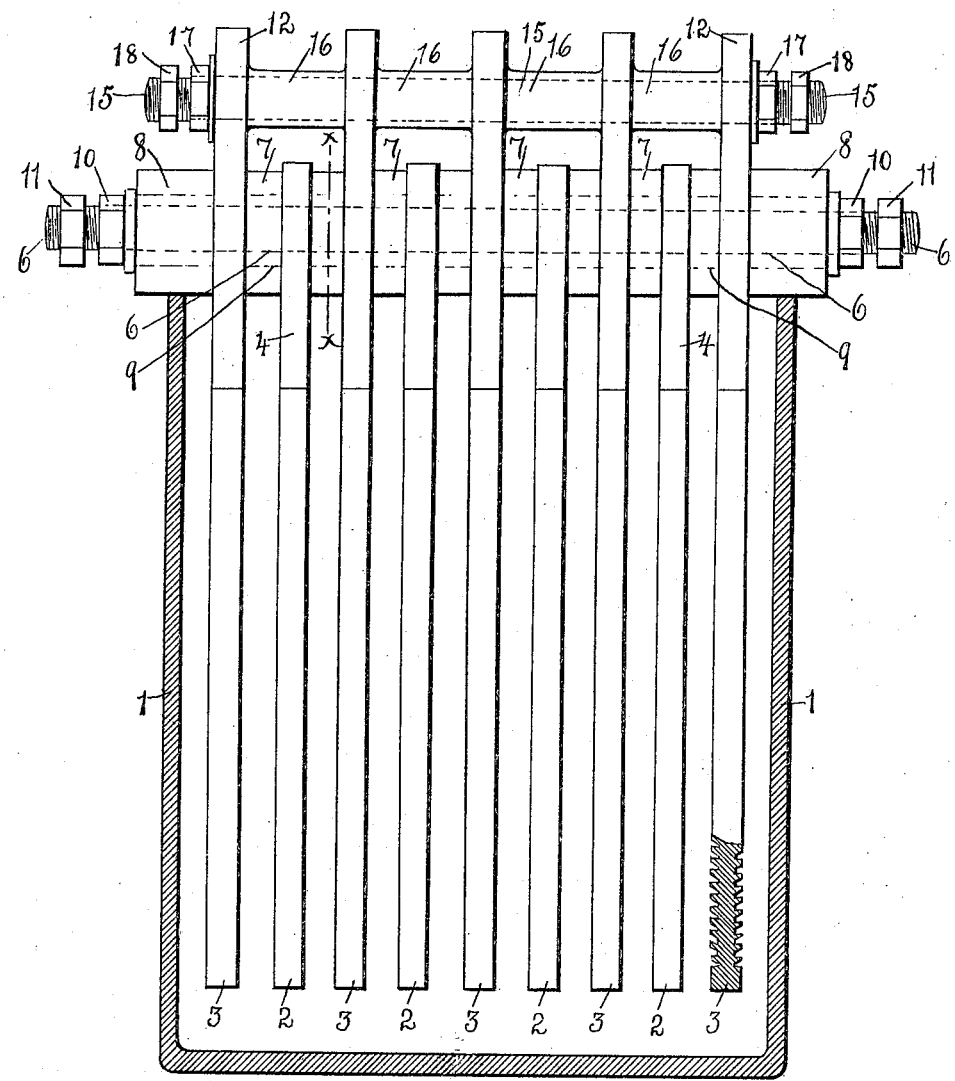
Figure 5:

In the drawings, Figure 1 is an end elevation showing my improved arrangement of plates within the cell. Fig. 2 is a side elevation of one of the positive plates, the upper suspending portion being a section taken in the line *x x* of Fig. 1. Fig. 3 is a side elevation of one of the negative plates, showing the suspending-orifice. Fig. 4 is a modified form of the suspending-orifice shown in Fig. 3, and Fig. 5 is a fragmentary portion of a section taken through one of the plates.

Referring to the drawings, 1 is the cell. (Shown in section in Fig. 1, in which figure is also shown in end elevation my improved plates and their novel arrangement.) In such figure, 2 2 are the shorter or positive lead plates, and 3 3 are the longer or negative lead plates, the two different plates being shown detached in side elevation in Figs. 2 and 3. The positive plates 2 are each provided at their upper ends with the central lug 4, provided with a central aperture 5, adapted for the snug reception of the rigid metallic support 6, preferably in the form of a cylindrical brass rod, which holds the plates 2 in central suspension, as shown. These plates 2 are uniformly spaced and held in such position upon the rod 6 by the intermediate insulating-bearings 7 and the end insulating-bearings 8, which envelop and rest snugly upon the lead collars 9, surrounding the brass rod 6. These insulating-bearings are preferably formed of wood properly treated with a suitable coating and filling. These lead collars 9 extend slightly beyond the ends of the insulating-bearings, so that when the lead plates 2 are tightened in spaced position upon the rod 6 by the end nuts 10 the metal of collars 9 will be jammed tightly against the abutting plates, thus forming a perfect metallic connection between the several plates 2 during the charging or discharging of the same. The outer screw-threaded ends of the rod 6 are also provided with the additional nuts 11, between which and the tightening-nuts 10 may be secured the metallic strips which connect the various cells of the battery. The spaced plates 2 thus held in central suspension may be supported in position in the cell by permitting the outer insulating-bearings 8 8 to rest upon the upper edge of the walls of the cell, as shown.

The longer or negative lead plates 3 are each provided at their upper ends with a central lug 12, provided with an elongated central orifice 13, and above it is the smaller circular aperture 14, adapted for the reception of the metallic carrier 15, preferably of brass, upon which the series of plates 12 are held in uniform spaced position, as shown, by means of the intermediate lead collars 16, which are slightly longer than the spaces between the plates, thus permitting them to be jammed tightly against such plates when they are secured in rigid position upon the carrier 15 by the tightening-nuts 17, thus forming a perfect metallic connection between the several plates 3 during the charging or discharging of the same. The outer screw-threaded ends of the carrier 15 are also provided with the additional nuts 18, between which and the tightening-nuts 17 may be secured the metallic strips which connect the various cells of the battery. The series of negative plates 3, rigidly held in spaced position upon the carrier 15, are arranged in alternation, as shown, with the positive plates 2 by causing the apertured lugs 12 13 to rest snugly upon the insulating-bearings 7 8, as clearly shown in Fig. 1.

In Fig 4 I have shown a modified form of negative plate 3, in which the orifice 13 has a side opening 19, which permits of the ready insertion or removal of the suspending insulating-bearings into or away from the orifices 13 without necessitating the separate removal of each plate, as required with the closed orifice, as shown in Fig. 3, thus greatly facilitating the separation or assemblage of parts.

It is apparent from the above description that the separate grouping of the two series of plates and their conjunctive arrangement in alternation within the cell possesses marked advantages over the present well-known forms of storage batteries, as by reason of their rigid central spaced suspension the usual separating-plates are entirely dispensed with, together with any supports within the cell, as all the present danger of short-circuiting between the plates is entirely eliminated by reason of their being kept permanently apart as described. During any disintegration of the plates which are immersed in the electrolyte the detached scales are permitted to fall freely to the bottom of the cell and entirely away from any accidental connecting contact between the plates, which is at present a troublesome cause of short-circuiting. As will be seen, there is no permanent metallic connection between the plates of the two series in my improved construction. In other words, the parts are separately mounted and temporarily connected by pressure, thus avoiding the present necessity of burning or soldering a connecting metallic strip to separate lugs on the plates of the two series. It is apparent that, if desired, the positive plates may be the longer ones and the negative plates the shorter ones, which would simply amount to a reversal of parts from that herein shown and described.

The feature of suspending one set of plates upon insulating-bearings on the other set, which rests upon the walls of the cell, and the collective separation of one set of plates from the other possesses marked advantages over the present mode of arrangement, especially in the matter of manipulation rendered necessary for renewal or repair.

I make no claim herein for any specific form of plate involving other than its mechanical features, my invention being confined simply to improved functions arising entirely from a novel arrangement and combination of parts in a purely-mechanical sense designed for greater efficiency of operation and durability and economy of construction.

I claim—

1. In a storage battery, a series of spaced positive plates and a series of spaced negative plates, the two series of plates being separately suspended in alternation within the cell, each plate of the two series being held in central suspension.

2. In a storage battery, a series of spaced positive plates and a series of spaced negative plates, the two series of plates being separately suspended in alternation within the cell, each plate of the two series being held in central rigid suspension.

3. In a storage battery, a series of spaced plates centrally suspended from a rigid support and a series of spaced plates centrally arranged upon a rigid carrier and centrally suspended upon insulated bearings on the rigid support of the first series of plates as and for the purpose stated.

4. In a storage battery, a series of plates rigidly and centrally suspended in spaced position upon a rigid metallic support, insulating-bearings upon the rigid metallic support at each end thereof and between the plates suspended thereon, and a series of plates rigidly secured in spaced position upon a rigid metallic carrier, each plate having a central orifice, adapted for the reception of the suspending insulating-bearings upon the rigid metallic support, all combined and operating as and for the purpose stated.

5. In a storage battery, a series of plates rigidly suspended in spaced position upon a rigid metallic support, insulating-bearings upon the rigid metallic support at each end thereof and between the plates suspended thereon, and a series of plates rigidly secured in spaced position upon a rigid metallic carrier, each plate having a central orifice with open side adapted for the ready insertion and removal of the suspending insulating-bearings upon the rigid metallic support, all combined and operating as and for the purpose stated.

6. In a storage battery, a series of plates rigidly suspended in spaced position upon a rigid metallic support, soft-metal collars upon the rigid metallic support and intermediate of the plates, insulating-bearings upon the rigid metallic support at each end thereof and between the plates suspended thereon, a series of plates rigidly secured in spaced position upon a rigid metallic carrier, each plate having a central orifice adapted for the reception of the suspending insulating-bearings upon the rigid metallic support, and soft metallic collars upon the rigid metallic carrier and within the insulating-bearings, all combined and operating as and for the purpose stated.

In testimony whereof I have signed my name to this specification in the presence of two subscribing witnesses.

JAMES P. WOOD.

Witnesses:
   ROSELINE F. HIGGINS,
   W. T. MILLER.